(12) United States Patent
Tokura

(10) Patent No.: US 8,757,760 B2
(45) Date of Patent: Jun. 24, 2014

(54) PRINTING APPARATUS AND CONTROL METHOD OF EXECUTING CHECK PRINTING

(75) Inventor: Yutaka Tokura, Ebina (JP)

(73) Assignee: Canon Kabushiki Kaisha (JP)

( * ) Notice: Subject to any disclaimer, the term of this patent is extended or adjusted under 35 U.S.C. 154(b) by 461 days.

(21) Appl. No.: 12/824,419

(22) Filed: Jun. 28, 2010

(65) Prior Publication Data

US 2011/0002001 A1    Jan. 6, 2011

(30) Foreign Application Priority Data

Jul. 1, 2009   (JP) ................................. 2009-156769

(51) Int. Cl.
*B41J 29/393*   (2006.01)

(52) U.S. Cl.
USPC .......................................................... 347/19

(58) Field of Classification Search
CPC ..... B41J 29/393; G06K 15/00; G06F 3/1234; G06F 3/121; G06F 3/1256
USPC .................................................... 347/17, 19
See application file for complete search history.

(56) References Cited

U.S. PATENT DOCUMENTS

| | | | | |
|---|---|---|---|---|
| 5,056,018 A | * | 10/1991 | Ikoma | 705/24 |
| 5,287,434 A | * | 2/1994 | Bain et al. | 235/462.15 |
| 6,633,323 B2 | * | 10/2003 | Beaufort | 347/240 |
| 7,567,360 B2 | | 7/2009 | Takahashi et al. | |
| 8,373,884 B2 | * | 2/2013 | Nakamura | 358/1.15 |
| 2004/0190057 A1 | | 9/2004 | Takahashi et al. | |
| 2006/0133832 A1 | * | 6/2006 | Watanabe et al. | 399/27 |
| 2009/0244620 A1 | | 10/2009 | Takahashi et al. | |

FOREIGN PATENT DOCUMENTS

| | | |
|---|---|---|
| JP | 2004-310746 A | 11/2004 |
| JP | 2004-310747 A | 11/2004 |
| JP | 2008-173845 A | 7/2008 |
| JP | 2008-281620 A | 11/2008 |
| JP | 2008-302554 A | 12/2008 |
| JP | 2009-126101 A | 6/2009 |

OTHER PUBLICATIONS

"How to disable automatic printing of the self test page when an HP printer is turned on" Askville by Amazon.*

* cited by examiner

*Primary Examiner* — Eric A Rust
(74) *Attorney, Agent, or Firm* — Rossi, Kimms & McDowell LLP

(57) ABSTRACT

A printing apparatus that facilitate a checking operation of printed matter during printing and can avoid deterioration of quality of the printed matter. A printer unit executes a printing process according to an inputted print job. A determination unit determines, when the print job is interrupted during the printing process of the printer unit, whether the interruption requires a check printing. A control unit controls the printer unit to execute the check printing after removing the interruption of the print job using print data of the print job when the determination unit determines that the interruption requires the check printing.

7 Claims, 16 Drawing Sheets

COMMON SPECIFICATIONS

SETTING OF CHECK PRINTING

CHECK PRINTING IS EXECUTED AFTER REMOVING INTERRUPTION CONDITION OF PRINTING APPARATUS.

ON        OFF

CANCEL    OK

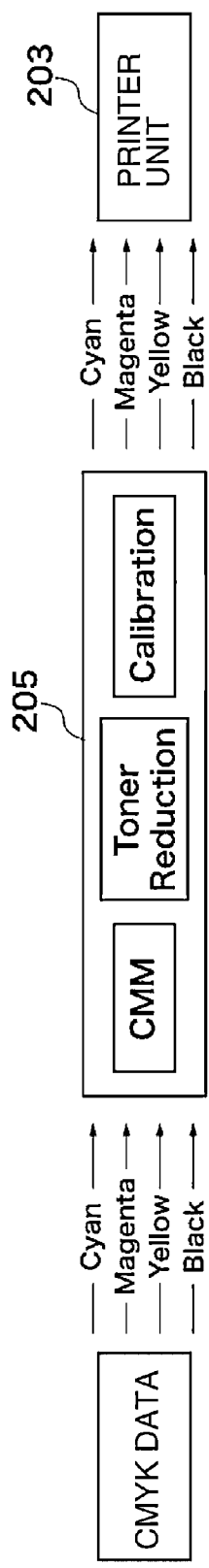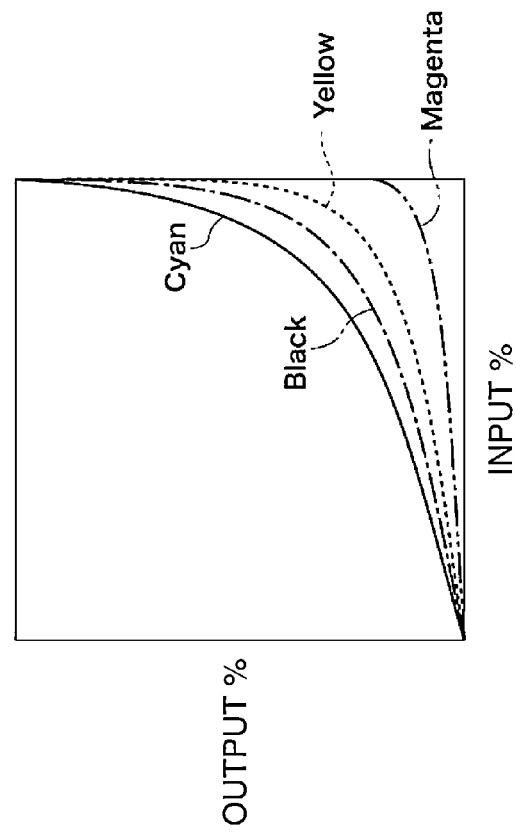
FIG.6A
FIG.6B

FIG.10

PRINTING IS INTERRUPTED.

DO YOU RESTART PRINTING USING APPARATUS ADJUSTMENT VALUES THAT HAVE BEEN SET BEFORE INTERRUPTION AFTER REMOVING INTERRUPTION ?

| YES | NO |

FIG.13

PRINTING IS INTERRUPTED.

PLEASE SELECT PROCESS AFTER REMOVING INTERRUPTION FROM AMONG FOLLOWING CHOICES.

STOP PRINT JOB.

RESTART PRINTING USING APPARATUS ADJUSTMENT VALUES THAT HAVE BEEN SET BEFORE INTERRUPTION FROM NOT-YET-OUTPUTTED PAGE.

RESTART PRINTING USING APPARATUS ADJUSTMENT VALUES THAT ARE SET AFTER INTERRUPTION FROM FIRST PAGE OF PRINT JOB.

RESTART PRINTING USING APPARATUS ADJUSTMENT VALUES THAT ARE SET AFTER INTERRUPTION FROM NOT-YET-OUTPUTTED PAGE.

FIG.14

| COMMON SPECIFICATIONS | | |
|---|---|---|
| SETTING OF CHECK PRINTING | | |
| UNDER ADJUSTMENT | ON | OFF |
| PAPER EMPTY | ON | OFF |
| JAM | ON | OFF |
| OUT OF TONER | ON | OFF |
| ERROR IN PAPER EJECTION ACCESSORY | ON | OFF |
| STOP BY USER | ON | OFF |
| CANCEL | | OK | ated at the time of the interruption of
PRINTING APPARATUS AND CONTROL METHOD OF EXECUTING CHECK PRINTING

BACKGROUND OF THE INVENTION

1. Field of the Invention

The present invention relates to a printing apparatus and a control method therefor of executing check printing.

2. Description of the Related Art

Japanese Laid-Open Patent Publication (Kokai) No. 2004-310746 (JP 2004-310746A) and Japanese Laid-Open Patent Publication (Kokai) No. 2004-310747 (JP 2004-310747A) disclose POD (Print On Demand) systems using a printing apparatus of an electrophotography method and a printing apparatus of an inkjet method.

Some of such printing apparatuses output a print sample during printing without stopping printing, and execute check printing so that a user can check a layout, a tint, etc. of printed matter.

The printing apparatus prints a page of which an image is processed at timing when the user pushes a check print button, or a page bundle including the page twice, outputs one of the pages or the page bundles to a designated ejection place as a regular printed matter, and outputs the other to a different ejection place.

Then, the user checks the printed matter that has been outputted to the different ejection place. If there is no problem in a layout, a tint, etc. of the printed matter, the user continues the printing. If there is a problem in a layout, a tint of the printed matter, the user stops the printing, corrects the print job, and restarts the printing.

However, in the above-mentioned conventional printing apparatus, since a user must push the check print button manually while considering a possibility of change of the tint etc. during a print job, a checking operation is troublesome.

When a print job is interrupted according to an interruption factor such as execution of calibration by which a tint is changed, a user may forget a checking operation for a tint after the interruption factor is resolved. In this case, the quality of printed matter may deteriorate.

SUMMARY OF THE INVENTION

The present invention provides a mechanism that facilitate a checking operation of printed matter during printing and can avoid deterioration of quality of the printed matter.

Accordingly, a first aspect of the present invention provides a printing apparatus comprising a printer unit configured to execute a printing process according to an inputted print job, a determination unit configured to determine, when the print job is interrupted during the printing process of the printer unit, whether the interruption requires a check printing, and a control unit configured to control the printer unit to execute the check printing after removing the interruption of the print job using print data of the print job when the determination unit determines that the interruption requires the check printing.

Accordingly, a second aspect of the present invention provides a control method for a printing apparatus comprising a determination step of determining, when a print job is interrupted during a printing process of a printer unit that executes the printing process according to an inputted print job, whether the interruption requires a check printing, and a control step of controlling the printer unit to execute the check printing after removing the interruption of the print job using print data of the print job when the determination unit determines that the interruption requires the check printing.

According to the present invention, the checking operation of printed matter during printing is facilitated and the deterioration of quality of the printed matter can be avoided.

Further features of the present invention will become apparent from the following description of exemplary embodiments with reference to the attached drawings.

BRIEF DESCRIPTION OF THE DRAWINGS

FIG. 6A is a block diagram schematically showing a control example for the printing apparatus by a control unit of the printing apparatus in FIG. 2.

FIG. 6B is a graph showing an example of a calibration table included in the control unit of the printing apparatus in FIG. 2.

FIG. 10 is a view showing an example of a setting screen displayed on the operation-display unit in step S105 in FIG. 8A.

FIG. 13 is a view showing an example of a setting screen displayed on the operation-display unit of a printing apparatus of another embodiment according to the present invention.

FIG. 14 is a view showing an example of a setting screen displayed on the operation-display unit of a printing apparatus of another embodiment according to the present invention.

DESCRIPTION OF THE EMBODIMENTS

Hereafter, embodiments according to the present invention will be described in detail with reference to the drawings.

Figure 1:
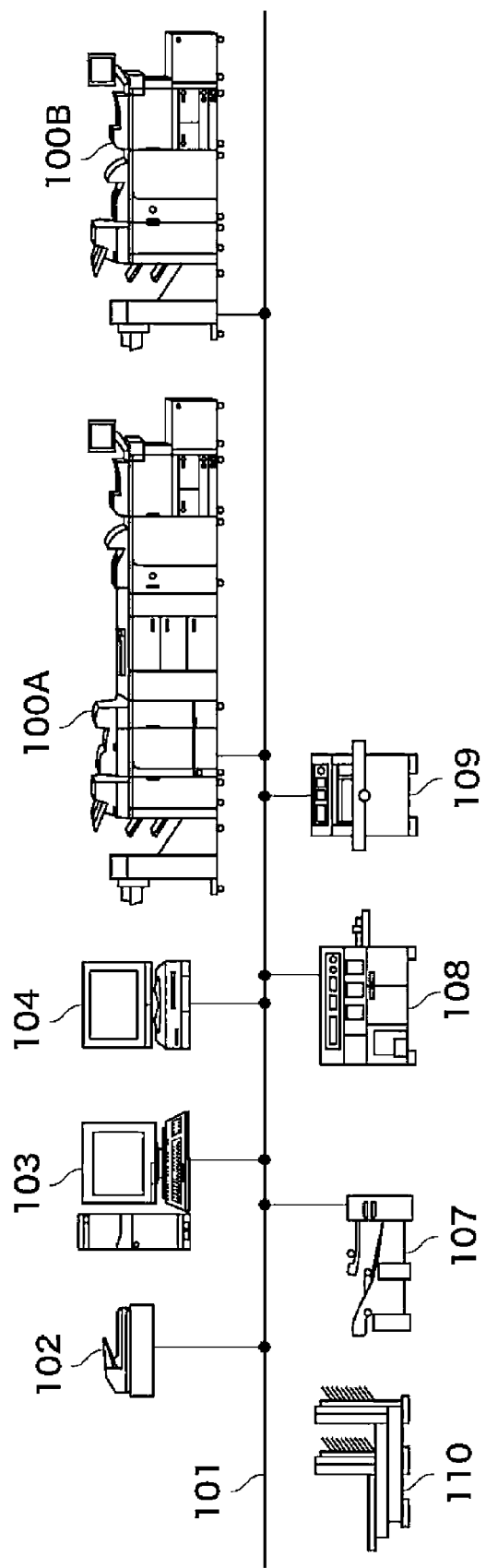
FIG. 1 is a view showing a configuration of a POD system provided with a printing apparatus of an embodiment according to the present invention.

FIG. 1 is a view showing a configuration of a POD system provided with a printing apparatus of an embodiment according to the present invention.

This POD system comprises a printing apparatus 100A of this embodiment, a printing apparatus 100B, a scanner 102, a server 103, a client PC 104, a paper folding machine 107, a perfect binding machine 108, and a cutting machine 109, which are mutually connected via a network 101 so as to enable communication. The POD system further comprises a saddle stitching machine 110 that is located outside the network to execute a saddle stitching process to printed matter printed by the printing apparatus 100A or 100B.

The printing apparatus 100A in this embodiment is an MFP (Multi Function Peripheral) that has a plurality of functions such as a copy function and a printer function. However, it may be an SFP (Single Function Peripheral) that has a copy function or a printer function only.

Figure 2:
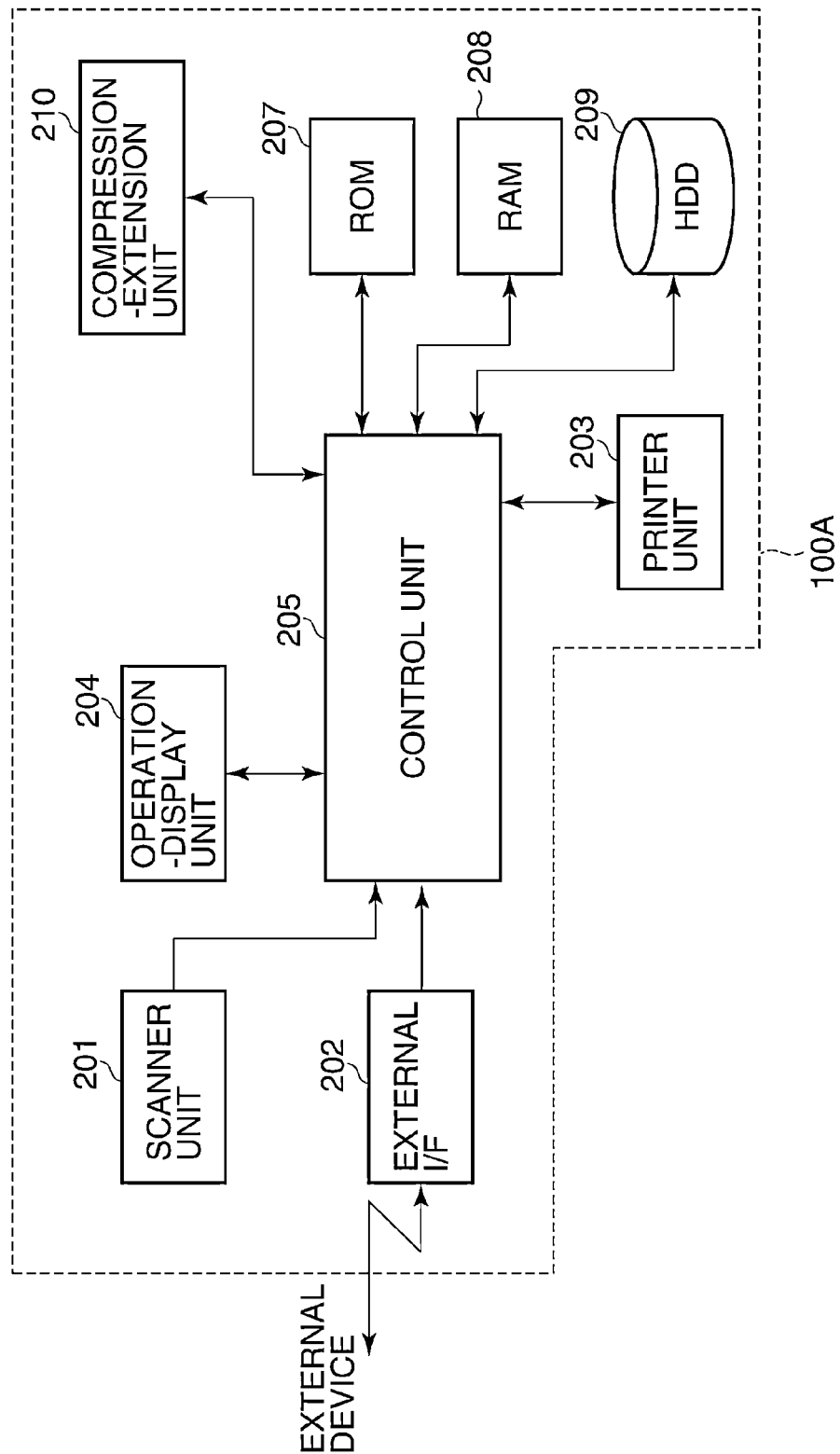
FIG. 2 is a block diagram schematically showing a configuration of the printing apparatus shown in FIG. 1.

FIG. 2 is a block diagram schematically showing a configuration of the printing apparatus shown in FIG. 1.

In FIG. 2, a scanner unit 201 reads an image of an original, converts it into image data, and outputs it to a control unit 205. An external I/F 202 exchanges (transmits and receives) data with an external device connected to the network 101. A printer unit 203 prints the image based on the inputted image data onto a sheet. An operation-display unit 204 has a key input section 402 and a touch panel section 401 (see FIG. 3) that receive instructions from a user.

The control unit 205 manages the entire control of the printing apparatus 100A. The control unit 205 prints image data stored in an HDD 209 by the printer unit 203 and transmits the image data to external devices, such as the server 103 and the printing apparatus 100B, via the external I/F 202 based on the user's instruction inputted through the operation-display unit 204. The control unit 205 acquires image data from the external devices, such as the server 103 and the printing apparatus 100B, via the external I/F 202 and searches an external device connected with the network 101 based on the user's instruction inputted through the operation-display unit 204.

A ROM 207 stores various programs executed by the control unit 205, a display control program required to display various setting screens on the operation-display unit 204, a boot sequence, font information, etc. The ROM 207 stores a program that is executed by the control unit 205 to interpret PDL (page description language) coded data received from the server 103, the client PC 104, or the like and to develop into raster image data.

A RAM 208 stores image data transmitted from the scanner unit 201 or the external I/F 202, and stores various programs and setup information that are loaded from the ROM 207.

The HDD 209 is large-capacity storage for storing image data that is inputted from the scanner unit 201 or the external I/F 202 and is compressed by the compression-extension unit 210.

The compression-extension unit 210 applies compression and expansion processes to the image data stored in the RAM 208 and the HDD 209 according to various compression methods such as JBIG and JPEG.

Next, a configuration of the operation-display unit 204 will be described with reference to FIG. 3 through FIG. 5.

Figure 3:
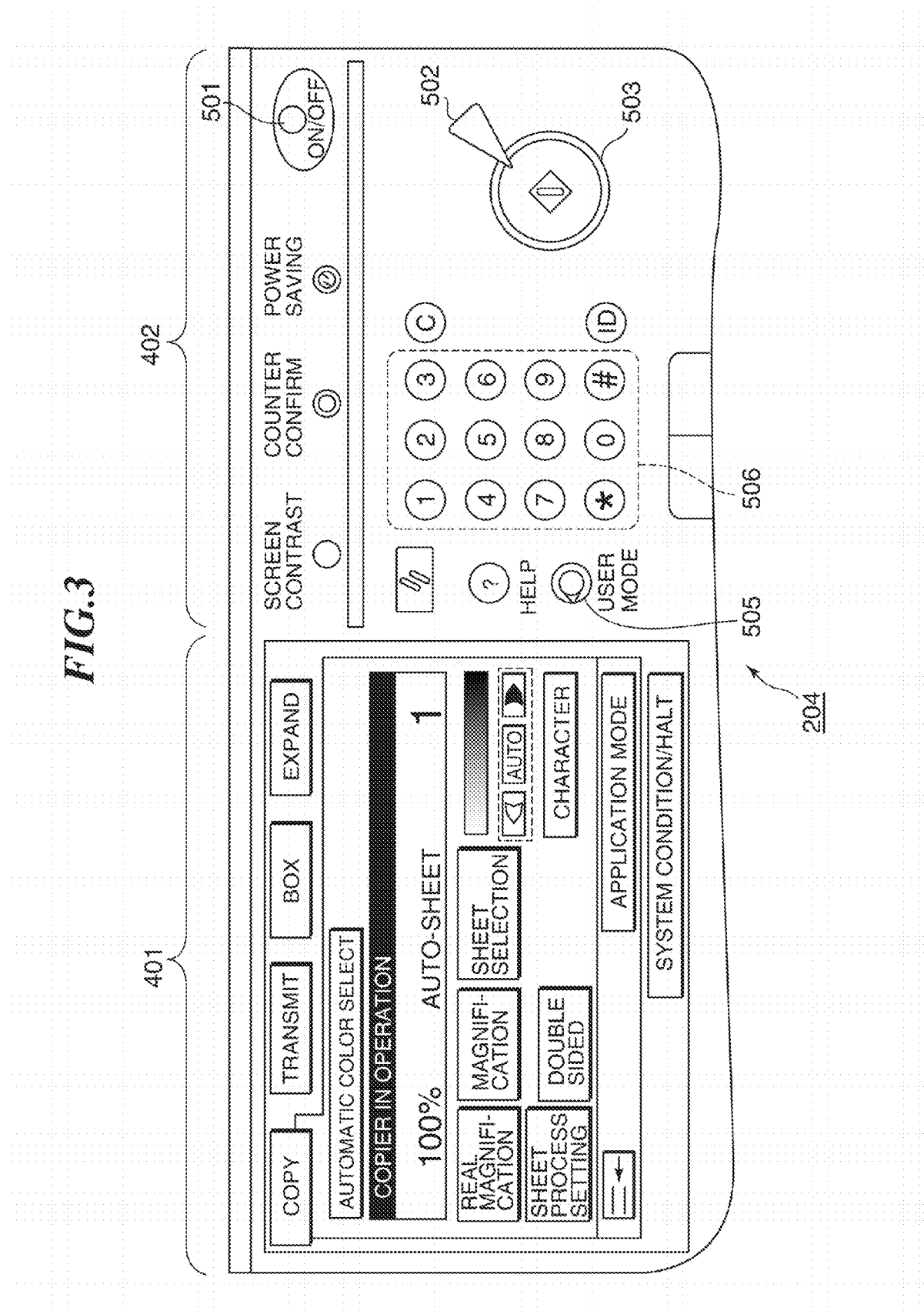
FIG. 3 is a plan view showing a configuration of an operation-display unit of the printing apparatus in FIG. 2.

The operation-display unit 204 is provided with the touch panel section 401 and the key input section 402 as shown in FIG. 3. The touch panel section 401 is constituted by pasting a clear electrode on an LCD, and displays various setting screens for receiving instructions from a user. The touch panel section 401 has a function to display various setting screens, and an instruction input function to receive instructions from a user.

Figure 4:
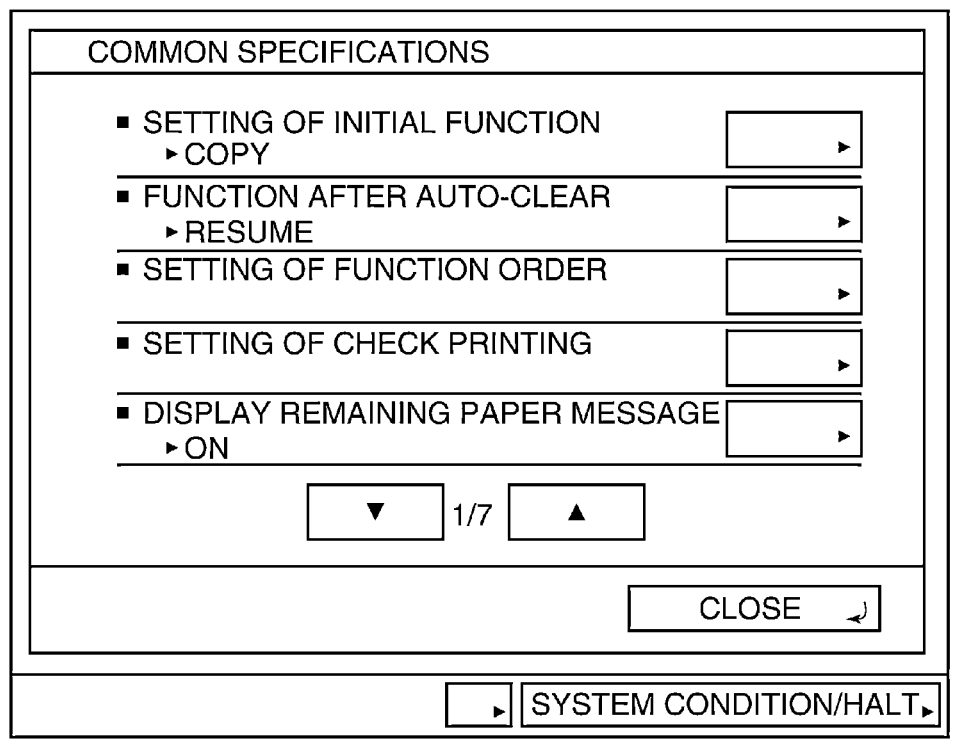
FIG. 4 is a view showing an example of a setting screen for common specifications displayed on a touch panel part of the operation-display unit in FIG. 3.
Figure 5:
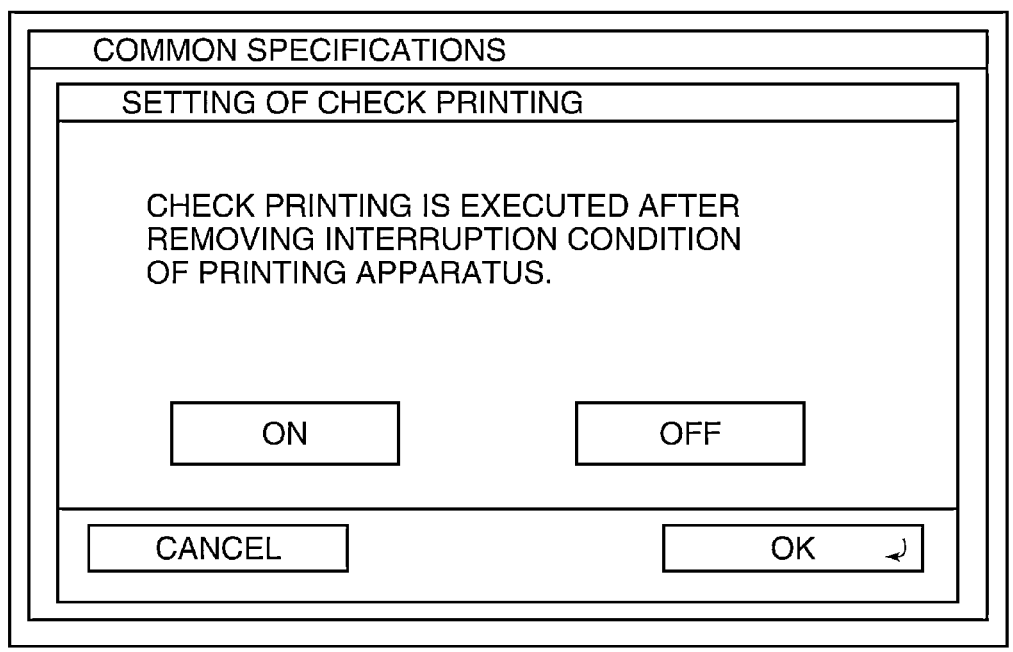
FIG. 5 is a view showing an example of a screen, which is displayed on the touch panel part of the operation-display unit in FIG. 3, on which a user sets about whether check printing will be executed after removing interruption of a print job.

FIG. 4 is an example of a setting screen for common specifications displayed on the touch panel section 401. When a button on the right side of an item "SETTING OF CHECK PRINTING" is pushed in this setting screen, a setting screen shown in FIG. 5 will be displayed. FIG. 5 is a view showing a screen on which a user sets about whether check printing will be executed after removing interruption of a print job of the printing apparatus 100A. When pushing an "ON" button in this setting screen, the check printing is automatically executed depending on a type of a factor of interruption (an interruption factor) after removing the interruption of the print job.

As shown in FIG. 3, the key input section 402 is provided with a power key 501, a start key 503, a stop key 502, a user mode key 505, a ten key 506, etc. The start key 503 is used to let the printing apparatus 100A start to execute a copy job or a transmission job. The ten key 506 is used to input a numerical value such as the number of print copies.

The control unit 205 controls the printing apparatus 100A so as to execute various processes based on the user's instruction received via the various setting screens displayed on the touch panel section 401 and the user's instruction received via the key input section 402.

It should be noted that the user interface that gives instructions to the printing apparatus 100A is not limited to the operation-display unit 204 of the printing apparatus 100A that is shown as an example in this embodiment. For example, it may be configured so that the printing apparatus 100A executes processes according to instructions that are given to the printing apparatus 100A from the user interface provided in the external devices such as the server 103 and the client PC 104.

When operating the printing apparatus 100A from an external device, the setting screen about the printing apparatus 100A is displayed on a display unit of the external device.

Hereafter, the client PC 104 is described as an example of the external device. When receiving a print execution request from a user, a CPU of the client PC 104 displays a setting screen on a display, and sets up a print job condition via this setting screen. When receiving the print execution request from the user, the CPU of the client PC 104 is controlled to associate the print process condition that has set via this setting screen with the image data to be printed to form one job, and to transmit the job to the printing apparatus 100A via the network 101.

On the other hand, when receiving the print execution request for the job from the client PC 104 via the external I/F 202, the control unit 205 of the printing apparatus 100A controls the printing apparatus 100A so as to execute the process based on the print process condition for this job.

Next, a control example of the printing apparatus 100A by the control unit 205 will be described with reference to FIG. 6A, FIG. 6B, FIG. 7A, and FIG. 7B.

As shown in FIG. 6A, the control unit 205 applies an image process to the image data of a CMYK format that is inputted into the control unit 205 via the external I/F 202 from the external device. During the image process in this stage, a color space process is applied by a CMM (a color management module), after that, a restriction process to restrict toner amount or ink amount that is defined by the printer unit 203, and then, a color correction process is applied by calibration.

The color correction process by the calibration corrects a color space according to the condition of the printer unit 203 with reference to a table (FIG. 6B) that defines a relation between an input percent value and an output percent value for each color (cyan, magenta, yellow, and black).

When a paper jam process or an internal-adjustment process for adjusting various factors such as temperature and density of the printer unit 203 intervenes in the printing process and the print job is interrupted, the printer unit 203 updates the values in the calibration table appropriately according to an environment at the time.

Figure 7A:
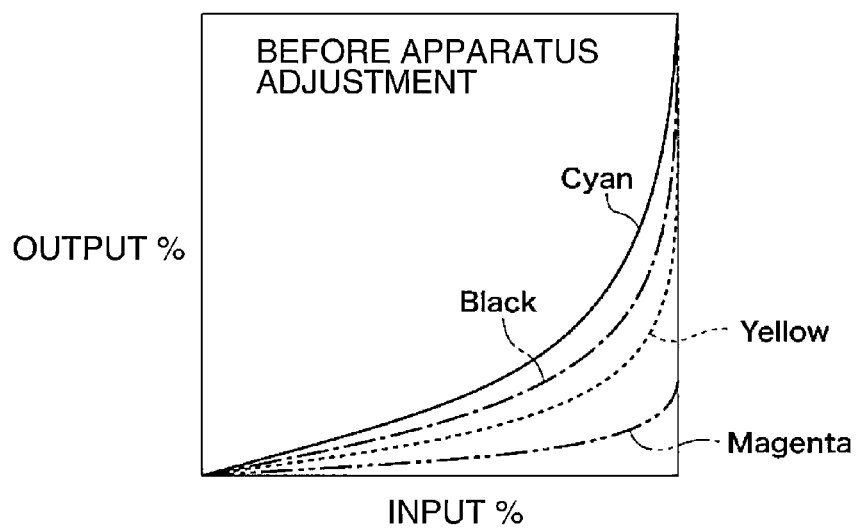
FIG. 7A is a graph showing an example of the calibration table that has been set before interruption of a print job.
Figure 7B:
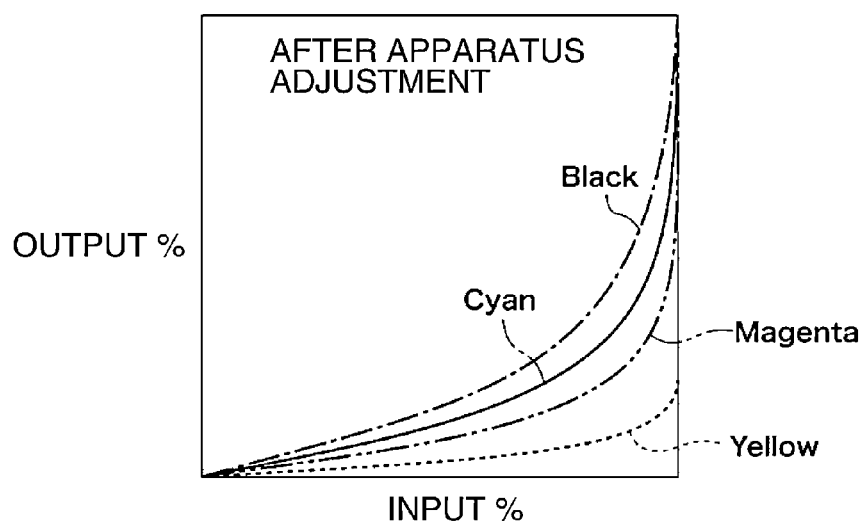
FIG. 7B is a graph showing an example of the calibration table that has been adjusted at the time of the interruption of the print job.

FIG. 7A indicates a graph showing an example of the calibration table that has been set before the interruption of the print job. FIG. 7B indicates a graph showing an example of the calibration table that has been adjusted at the time of the interruption of the print job.

Figure 8A:
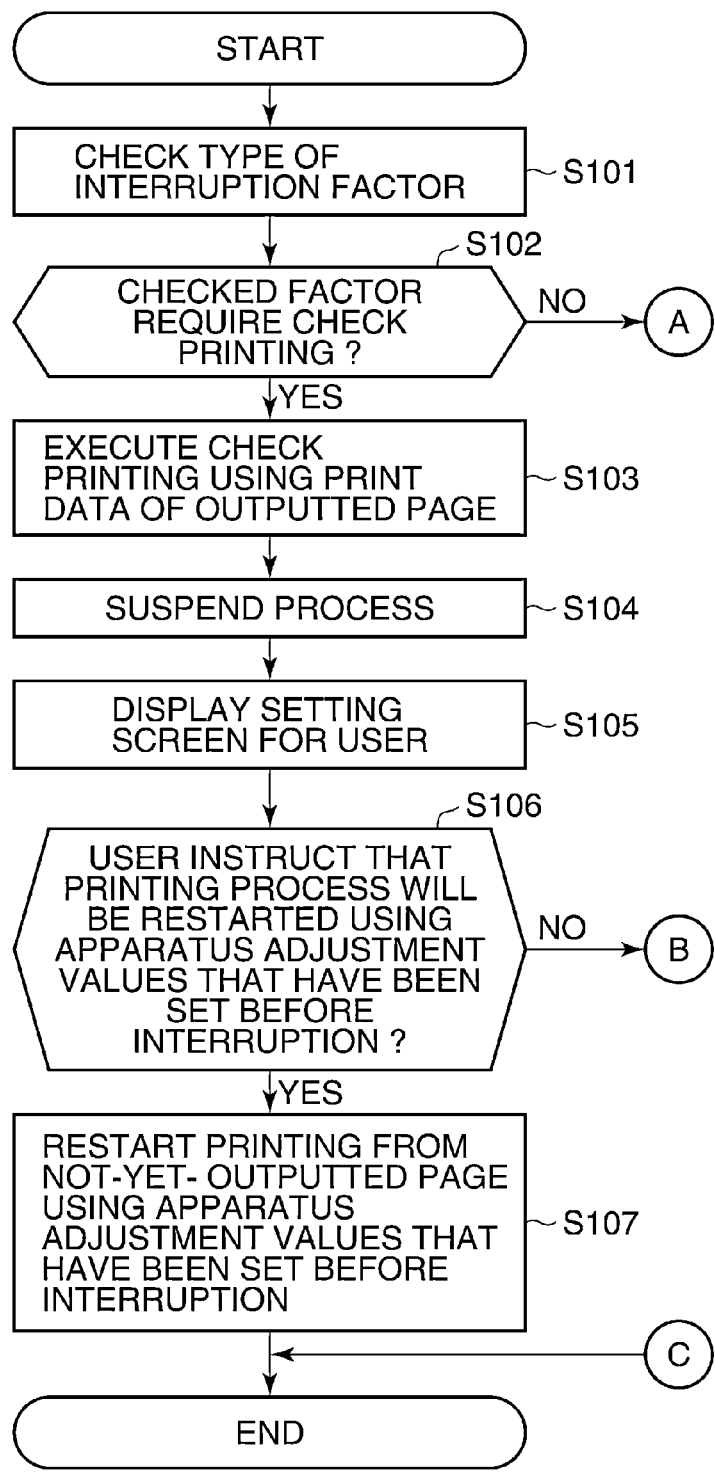
FIG. 8A and FIG. 8B are flowcharts showing an operation example of the printing apparatus when the print job is interrupted due to a certain reason during a printing process.
Figure 8B:
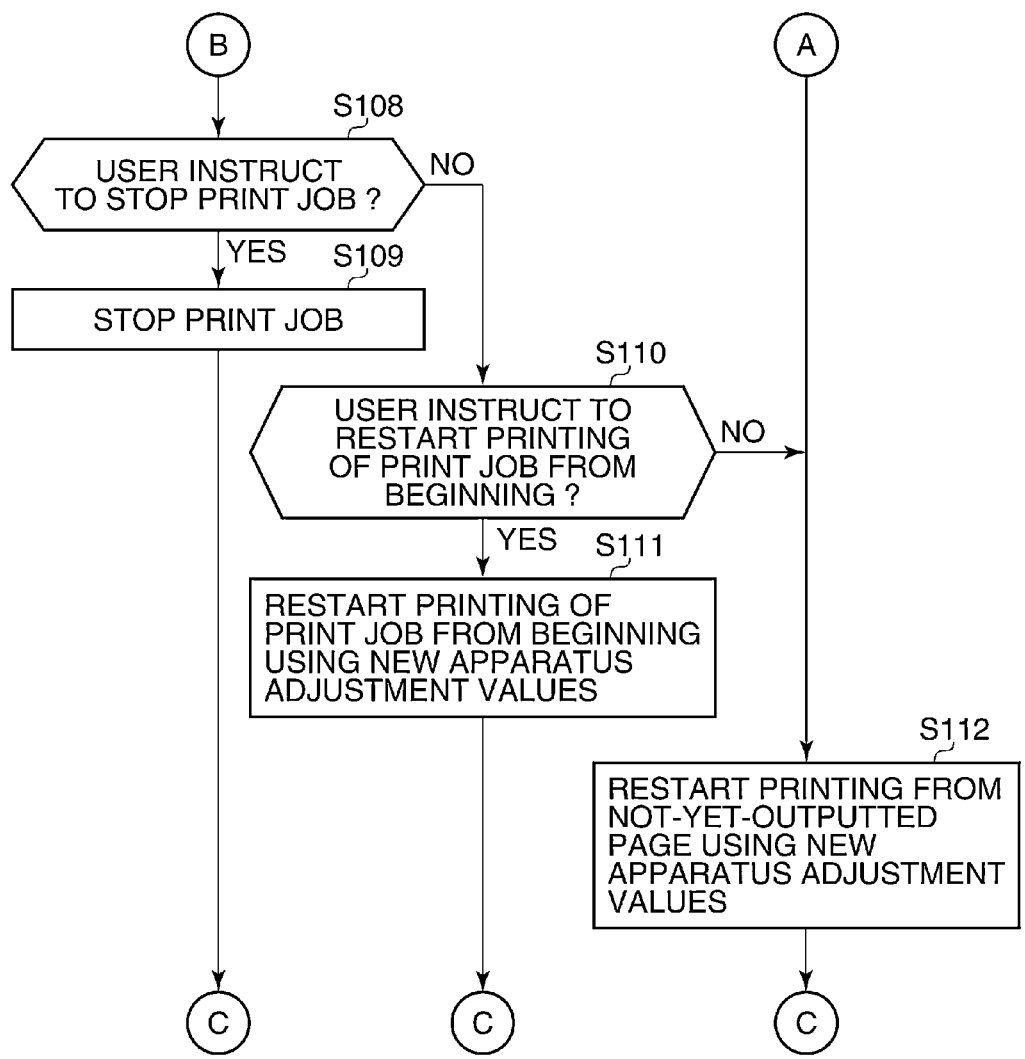
Figure 9:
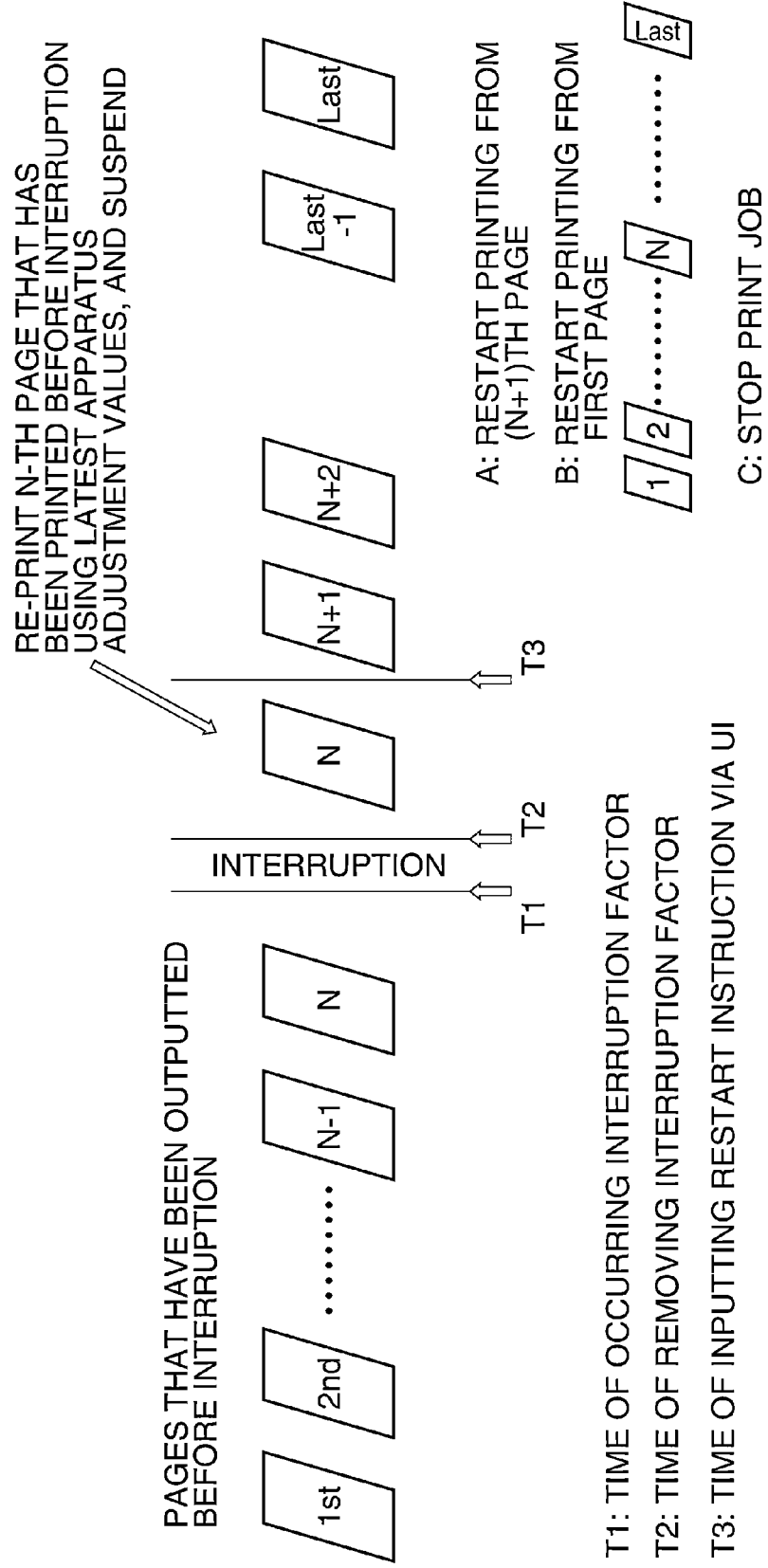
FIG. 9 is a schematic view showing the operation example of the printing apparatus that is executed before and after the interruption of the print job.

Next, an operation example of the printing apparatus 100A when the print job is interrupted during the printing process due to a certain cause will be described with reference to FIG. 8A through FIG. 13. Each process in FIG. 8A and FIG. 8B is realized by loading a control program stored in the ROM 207, the HDD 209 or the like of the printing apparatus 100A onto the RAM 208 and by executing the program by the CPU of the control unit 205. It is assumed that the user has set to execute the check printing automatically after removing interruption of a print job according to the type of interruption factor in the setting screen (FIG. 5) on the operation-display unit 204.

In step S101, the control unit 205 checks the type of factor that interrupts the print job, and proceeds with the process to step S102.

In the step S102, the control unit 205 determines whether the factor checked in the step S101 requires the check printing. Here, it is determined based on whether any change occurs between the images printed before and after the interruption. Specifically, a paper empty error and an error about a finishing process as a post-print process do not require the check printing. An error that may change the calibration table, for example, the internal-adjustment process for adjusting various factors such as temperature and density of the printer unit 203, requires the check printing.

When the factor checked in the step S101 requires the check printing, the control unit 205 proceeds with the process to step S103. When the factor checked in the step S101 does not require the check printing, the control unit 205 proceeds with the process to step S112.

In the step S103, the control unit 205 controls the printer unit 203 so as to print the print data of the last page that has been outputted before the interruption of the print job using the value of the updated calibration table as the check printing, and proceeds with the process to step S104. When it will be described with reference to FIG. 9, the printing process is interrupted after finishing the printing of the N-th page, and the N-th page is printed using the latest apparatus adjustment values, i.e., the values in the updated calibration table, after removing the interruption.

In the step S104, the control unit 205 suspends the process of the printer unit 203, and proceeds with the process to step S105.

In step the S105, the control unit 205 displays the setting screen for a user on the operation-display unit 204, and proceeds with the process to step S106. FIG. 10 shows an example of the setting screen displayed on the operation-display unit 204 in the step S105.

In the step S106, the control unit 205 determines whether the printing process will be restarted using the apparatus adjustment values that have been set before the interruption after removing the interruption according to the instruction from the user in the setting screen in FIG. 10. Then, when the control unit 205 will restart the printing process using the apparatus adjustment values that have been set before the interruption after removing the interruption, the process proceeds to step S107. Otherwise, the process proceeds to step S108.

The apparatus adjustment value is a value of calibration. Color corrections by the printer unit 203 after interrupting the print job change the values in the calibration table that is held in the control unit 205. Accordingly, the user is required to determine whether the printing process will be restarted using new calibration values or old calibration values in the setting screen in FIG. 10. Here, the user determines with reference to the check printing printed in the step S103.

In the step S107, the control unit 205 restarts the printing process using print data of the following pages that have not been outputted by the printer unit 203 while using the apparatus adjustment values that have been set before the interruption, and then, finishes the processing. As shown in "A" in FIG. 9, specifically, the printing job is restarted from the (N+1)th page (the page next to the last page that has been outputted before the interruption).

Figure 11:
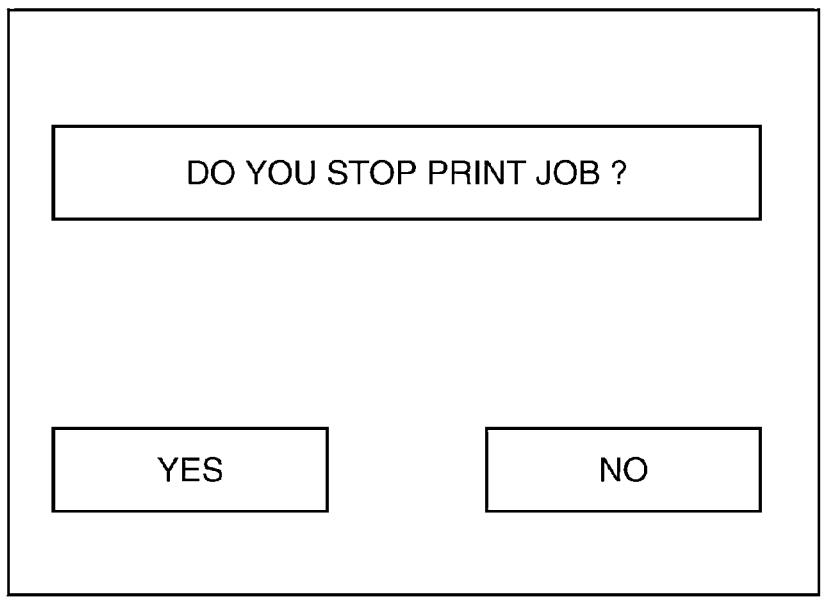
FIG. 11 is a view showing an example of the setting screen displayed on the operation-display unit in step S108 in FIG. 8B.

In the step S108, the control unit 205 displays the setting screen shown in FIG. 11 on the operation-display unit 204, and determines whether the user's instruction in this setting screen is directed to stop the print job. When stopping the print job, the control unit 205 proceeds with the process to step S109. When the print job is not stopped, the process proceeds to step S110.

In the step S109, the control unit 205 stops the print job and finishes the process. The process here is equivalent to "C" in FIG. 9.

Figure 12:
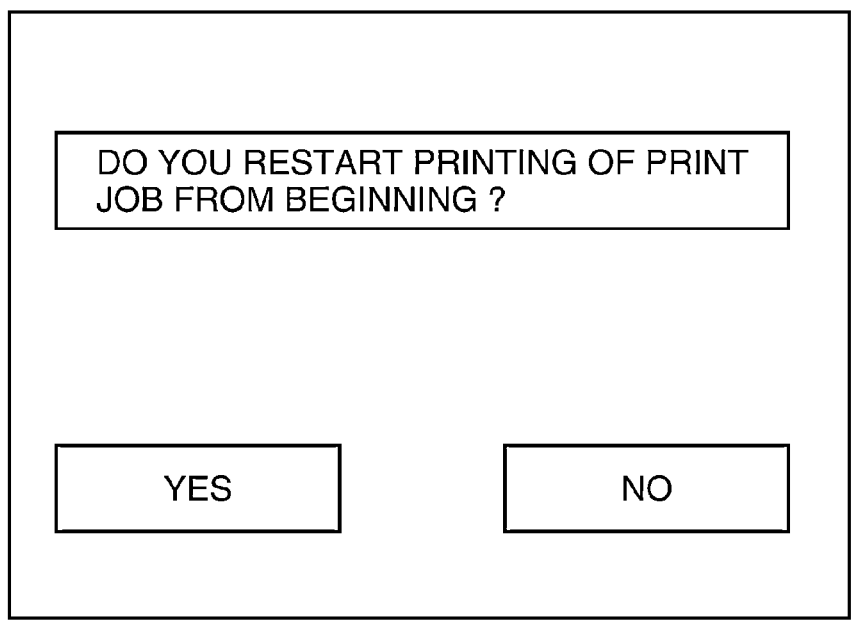
FIG. 12 is a view showing an example of the setting screen displayed on the operation-display unit in step S110 in FIG. 8B.

On the other hand, in the step S110, the control unit 205 displays the setting screen shown in FIG. 12 on the operation-display unit 204, and determines whether the user's instruction in this setting screen is directed to restart the printing of the print job from the beginning. When restarting the printing of the print job from the beginning, the control unit 205 proceeds with the process to step S111. If this is not the case, the process proceeds to step S112.

In the step S111, the control unit 205 restarts the printing of the print job from the beginning using the updated apparatus adjustment values, and finishes the process. The process here is equivalent to "B" in FIG. 9.

In the step S112, the control unit 205 restarts the printing process using the print data of the following pages that have not been outputted by the printer unit 203 while using the apparatus adjustment values that have been updated, and then, finishes the process. The process here is equivalent to "A" in FIG. 9.

As described above, in this embodiment, the check printing is automatically executed after removing the interruption factor of the print job. Accordingly, the checking operation of printed matter during the printing is facilitated and the deterioration of quality of the printed matter can be avoided.

It should be noted that the present invention is not limited to what has been described with the above-mentioned embodiment, and can be changed suitably unless it is deviated from the scope of the present invention.

For example, although the setting screens shown in FIG. 10, FIG. 11, and FIG. 12 are displayed on the operation-display unit 204 in order in the above-mentioned embodiment, the contents displayed in the setting screens shown in FIG. 10, FIG. 11, and FIG. 12 can be displayed in one setting screen as shown in FIG. 13.

It can be controlled so that the check printing is automatically executed after removing the interruption factor, only when the printing is interrupted by the interruption factor of the specific type designated by the user via the operation-display unit 205 among a plurality of interruption factors of the print job. For example, interruption due to an execution of calibration and interruption due to out-of-toner can be set as the interruption factors of the specific type.

Specifically, a user sets about whether the check printing will be executed automatically after removing an interruption factor for every type of interruption factor in a setting screen shown in FIG. 14, for example. The control unit 205 is controlled so that the check printing is automatically executed after removing the interruption factor, only when the printing is interrupted by the interruption factor that is set to execute the check printing automatically in the setting screen.

Figure 15:
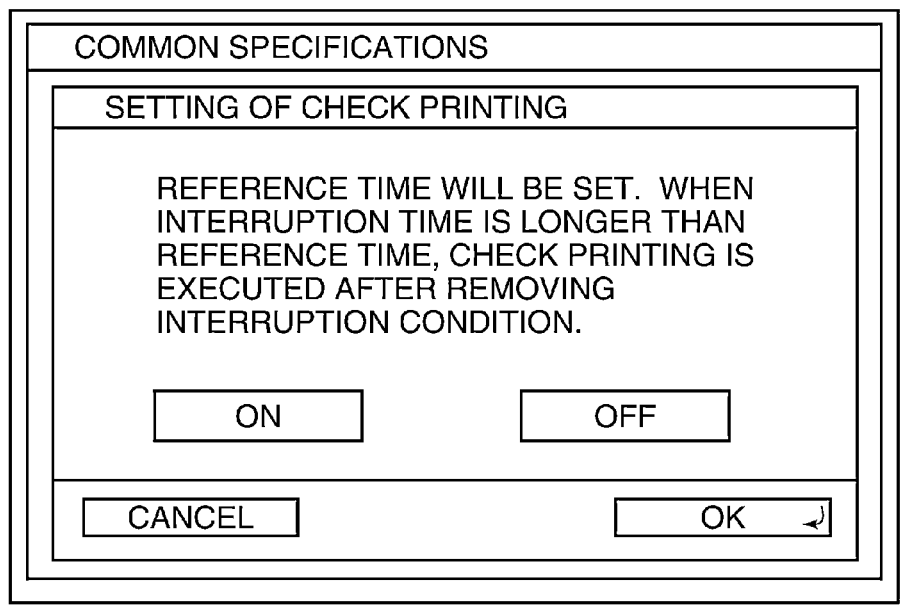
FIG. 15 is a view showing an example of a setting screen displayed on the operation-display unit of a printing apparatus of another embodiment according to the present invention.

Further, the necessity of the check printing may be determined according to an interruption time rather than the type of the interruption factor of the print job. That is, it may be controlled so that the check printing is executed automatically when an interruption time is longer than a predetermined reference time. In this case, the setting screen shown in FIG. 15 can be displayed to urge a user to set the reference time as a decision criterion, for example.

Other Embodiments

Aspects of the present invention can also be realized by a computer of a system or apparatus (or devices such as a CPU or MPU) that reads out and executes a program recorded on a memory device to execute the functions of the above-described embodiment(s), and by a method, the steps of which are executed by a computer of a system or apparatus by, for example, reading out and executing a program recorded on a memory device to execute the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156769, filed on Jul. 1, 2009, which is hereby incorporated by reference herein in its entirety.

What is claimed is:

1. A printing apparatus comprising:
   a setting unit configured to set whether a check printing is to be executed after removing interruption of a print job, the check printing being executed to allow a user to check the result of a printing process of a printer unit to be executed according to the print job;
   a determination unit configured to determine, when the print job is interrupted, whether the interruption of the print job requires the check printing;
   a control unit configured to control the printer unit to execute the check printing using print data of the already output last page of the interrupted print job in a case where said determination unit determines that the interruption of the print job requires the check printing and said setting unit sets that the check printing is to be executed; and
   a display unit configured to display a first setting screen that allows the user to instruct whether to restart the printing from the beginning, after executing the check printing,
   wherein the control unit controls the printer unit to execute the printing process thereof from:
      the first page of the interrupted print job, in a case where the user instructs to restart the interrupted print job from the beginning through the first setting screen; and
      a next page of the already output last page of the interrupted print job, in a case where the user does not instruct to restart the interrupted print job from the beginning through the first setting screen.

2. The printing apparatus according to claim 1, wherein said determination unit determines whether the interruption requires the check printing based on a type of factor of the interruption.

3. The printing apparatus according to claim 1, wherein said determination unit determines that the interruption requires the check printing when an interruption time is longer than a predetermined time.

4. The printing apparatus according to claim 1, wherein said control unit suspends the printing process after executing the check printing by said printer unit, and displays a second setting screen in which a user instructs whether to restart the printing after removing the interruption using adjustment values for said printer unit that have been set before the interruption on a display unit.

5. The printing apparatus according to claim 4, wherein said control unit displays a third setting screen that allows the user to instruct whether to stop the print job on the display unit, when the user instructs not to restart the printing by said printer unit after removing the interruption using the adjustment values that have been set before the interruption.

6. The printing apparatus according to claim 1, wherein said control unit restarts the printing process by said printer unit from the print data of the page next to the last page that has been output before the interruption using the adjustment values for said printer unit that are set after removing the interruption, when said determination unit determines that the interruption does not require the check printing.

7. A control method for a printing apparatus, the method comprising:
   a setting step of setting whether a check printing is to be executed after removing interruption of a print job, the check printing being executed to allow a user to check the result of a printing process of a printer unit to be executed according to the print job;
   a determination step of determining, when a print job is interrupted, whether the interruption of the print job requires a check printing;
   a control step of controlling the printer unit to execute the check printing using print data of the already output last page of the interrupted print job in a case where said determination step determines that the interruption of the print job requires the check printing and said setting step sets that the check printing is to be executed; and
   a display step of displaying a setting screen that allows the user to instruct whether to restart the printing from the beginning, after executing the check printing,
   wherein the control step controls the printer unit to execute the printing process thereof from:
      the first page of the interrupted print job, in a case where the user instructs to restart the interrupted print job from the beginning through the setting screen; and
      a next page of the already output last page of the interrupted print job, in a case where the user does not instruct to restart the interrupted print job from the beginning through the setting screen.

* * * * *